United States Patent [19]
Chiu

[11] Patent Number: 5,587,708
[45] Date of Patent: Dec. 24, 1996

[54] DIVISION TECHNIQUE UNIFIED QUANTIZER-DEQUANTIZER

[75] Inventor: Chung-Yen Chiu, Taipei, Taiwan

[73] Assignee: Industrial Technology Research Institute, Chutung, Taiwan

[21] Appl. No.: 184,368

[22] Filed: Jan. 19, 1994

[51] Int. Cl.⁶ .................................................. H03M 2/36
[52] U.S. Cl. .............................. 341/76; 341/200; 341/50; 341/67
[58] Field of Search ............................ 341/200, 50, 67; 348/405; 375/26

[56] References Cited

U.S. PATENT DOCUMENTS

| | | | |
|---|---|---|---|
| 4,862,173 | 8/1989 | Nishitani | 341/200 |
| 5,231,484 | 7/1993 | Gonzales | 358/133 |

Primary Examiner—Jeffrey A. Gaffin
Assistant Examiner—Jason H. Vick
Attorney, Agent, or Firm—Meltzer, Lippe, Goldstein, et al.

[57] ABSTRACT

A division technique unified quantizer-dequantizer circuit is disclosed. The unified quantizer-dequantizer includes a division circuit receiving a half step size q and an input signal x. The division circuit outputs a quantized coefficient signal y and a remainder R, where $$|y| = \lfloor \frac{|x|}{2q} \rfloor \text{ and } R = |x| - \lfloor \frac{|x|}{2q} \rfloor$$

The unified quantizer-dequantizer also includes a circuit receiving the quantized coefficient signal y, the remainder R, the half step size q and the input signal x. This circuit outputs a reconstructed signal r where, $$r = \text{sgn}(x) \cdot \left( |x| - \begin{cases} R & \text{if } y = 0 \\ (R-q) & \text{if } y \neq 0 \; q \text{ is odd} \\ (R-q+1) & \text{if } y \neq 0 \; q \text{ is even} \end{cases} \right)$$

10 Claims, 4 Drawing Sheets

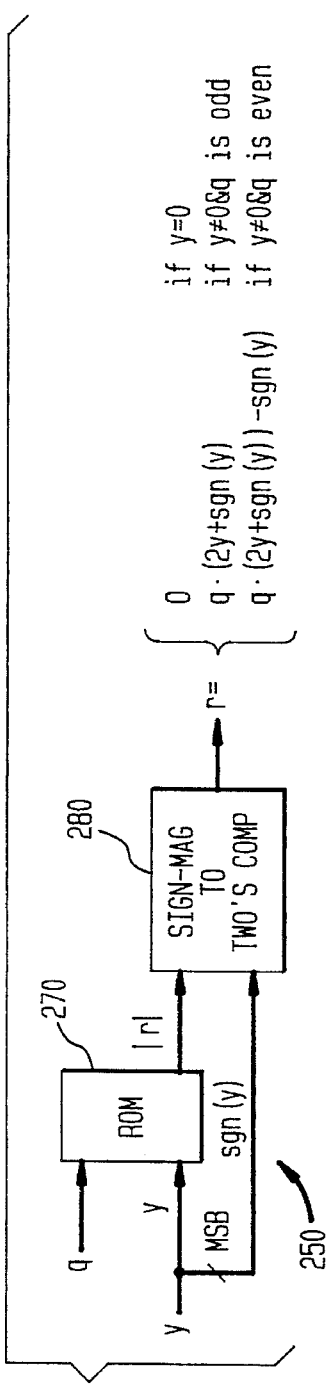
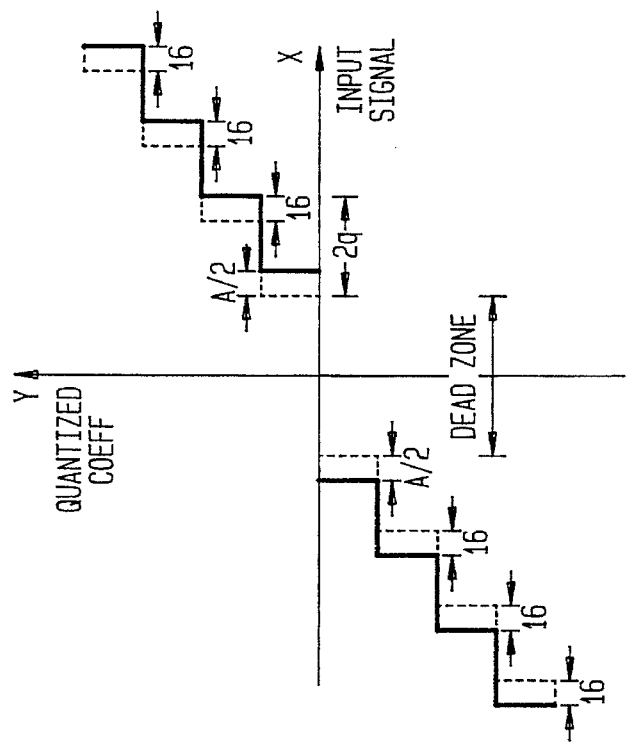
FIG. 3
(PRIOR ART)
FIG. 7
(PRIOR ART)
FIG. 2
(PRIOR ART)

DIVISION TECHNIQUE UNIFIED QUANTIZER-DEQUANTIZER

FIELD OF THE INVENTION

The present invention relates to signal compression, for example, compressing video signals. In particular, the present invention relates to a unified quantizer-dequantizer which utilizes a division technique.

BACKGROUND OF THE INVENTION

A conventional H.261 encoder 10 is illustrated in FIG. 1. A frame of video to be encoded is stored in the input frame buffer 12. If a macroblock is intraframe encoded, coding is as follows. Each 8×8 block in the macroblock is transmitted to the Discrete Cosine Transform (DCT) circuit 14 (no subtraction takes place in the subtractor 16 as the input to the subtractor 16 on line 17 is zero when intramode coding is used). The DCT coefficients output by the DCT circuit 14 are then quantized by the quantizer 18. The block of quantized transform coefficients output by the quantizer 18 is then zig-zag scanned using the scanning pattern shown in FIG. 2. The quantized transform coefficients then undergo run-level conversion using the run-level converter 20. The resulting run-level pairs are then coded by the variable length coder 22 and stored in the output buffer 24.

The output buffer 24 is used because the bit rate output of the variable length coder 22 is inherently variable. Using a control mechanism described below, the output buffer outputs a constant rate bit stream on the channel 26 for real time communications.

The quantization step size of the quantizer 18 is the same for all transform coefficients in a macroblock. However, the quantization step size can be changed from one macroblock to the next. The quantization step size is normally controlled by the amount of space left in the output buffer 24. The output buffer controller 28 senses the amount of space left in the buffer 24 and send a feedback signal to the quantizer 18 (as well as the inverse quantizer 30) to control the step size. When the buffer 24 has excess capacity, the quantization step size can be decreased in order to increase the amount of transmitted data to obtain a better quality reconstructed image.

On the other hand, when the buffer 24 is nearly full, the quantization step size can be increased to reduce the amount of transmitted data at the expense of picture quality.

When a macroblock is interframe encoded, coding proceeds as follows. A decision is made whether to perform intra or intermode processing. The decision is made by the inter/intra decision circuit 40. The decision to perform inter or intra mode processing for a macroblock is made on the basis of the energies of the luminance prediction error and of the variance of the original luminance signal. The original luminance signal is transmitted to the decision circuit 40 from the input frame 12. The luminance prediction is transmitted to the decision circuit from the loop filter 42. In general, intramode coding is used if the original luminance signal has less AC energy than the luminance prediction error has total energy. However, if the prediction error has sufficiently small energy, then intermode coding is used for the macroblock. If the decision circuit 40 decides to use intramode processing for a macroblock, the multiplexer 44 outputs a zero to the input 17 of subtractor 16 and the coding proceeds as described above for a block in intraframe mode icoding (i.e., DCT, quantization run-level conversion, variable length coding). If the decision circuit 40 decides to use intermode processing, a prediction is output by the multiplexer 44 to the input 17 of the subtractor. The prediction is subtracted from the original signal using the subtractor 17 and the residues are then coded using DCT circuit 14, quantizer 18, run-level converter 20, and variable length coder 22. The coded residue transform coefficients are stored in the output buffer 24 whose contents is used to control the quantization step size using the feed back mechanism described above.

The prediction used for the inter/intra decision and for intermode coding is a motion compensated prediction. This prediction is obtained as follows. The previously reconstructed frame is stored in the previous frame memory 50. The motion estimation circuit 52 receives a macroblock of pixels of the current frame from the input buffer 12. The motion estimation circuit 52 also receives a corresponding search area in the previous frame from the previous frame memory 50. The displacement of the current block in the search area which results in the best match is output by the motion estimation circuit as the motion vector. When intermode coding is used, the motion vector is transmitted to the variable length coder 22 for coding and transmission via the channel 26.

The motion vector is also transmitted to the motion compensation circuit 54 which accesses from the frame memory a motion compensated prediction for the current block. The loop filter 42, which also receives the motion vector, removes artifacts associated with the motion compensation.

The encoder 10 of FIG. 1 includes a decoder 31 for generating the pixel values stored in the previous frame memory 50. The decoder 31 includes the inverse quantizer circuit 30 and the inverse DCT circuit 32. When intramode processing is used, the quantized transform coefficients generated by the quantizer 18 are inverse quantized by the inverse quantizer 30. Then the Inverse Discrete Cosine Transform circuit 32 is used to reconstruct the original pixel values. When intramode processing is used, the multiplexer 44 outputs a zero so there is a zero at the input 33 of the adder 34. Thus, there constructed original pixel values are transferred directly to the previous frame memory 50. When intermode processing is used, the quantized residual transform coefficients output by the quantizer 18 are processed by the inverse quantizer 30 and the inverse DCT circuit 32 to generate reconstructed residual pixel values. The reconstructed residual pixel values are added to the motion compensated prediction using adder 33 to obtain reconstructed original pixel values which are stored in the previous frame memory 50. The loop delay 34 is provided to compensate for the delays of the coding/decoding loop.

The H.261 decoder is described in detail in the CCITT H.261 Standard; Ruetz et al "High-Performance Full-Motion Video Compression Chip Set", IEEE Trans. on Circuits and Systems for Video Technology, Vol. 2, No. 2, June 1992, PP 111–121; Fujiwara et all "An All-ASIC Implementation of a Low Bit Rate Video Codec" IEEE trans on Circuits and Systems for Video Technology, Vol.2, NO.2, PP 123–133; and CCITT Video Compression Chipset Technical Note, LSI Logic Corporation 1991. The contents of these references are incorporated herein by reference.

An illustrative quantization function is depicted in FIG. 3. FIG. 3 shows the plot of the quantization function $y=g(x,q)$ where x is an input signal value, q is the half step size and y is the quantized coefficient. As shown, the function $y=g(x, q)$ is given by:

$$y = \text{sgn}(x) \cdot \lfloor \frac{|x|}{2q} \rfloor \quad (1)$$

(In equation (1), "⌊ ⌋" means "the floor of" or "truncate." Thus, ⌊2.3⌋=⌊2.5⌋=⌊2.9999⌋=2. ) As shown, the step size around the origin is larger, i.e., 4 q. This area around the origin is referred to as the "dead zone."

A first prior art quantizer 100 is shown in FIG. 4 for producing the quantized coefficient signal y of an input signal x such as shown in FIG. 3. The prior art quantizer 100 utilizes a multiplication technique. The quantizer 100 has a conversion circuit 110 which receives a two's complement input signal x and converts it to sign-magnitude form. The magnitude |x| is input to a multiplier circuit 120. The quantizer 100 also has a reciprocal ROM 130 which receives a half step size q. The reciprocal ROM 130 uses the half step size q as an index for retrieving the reciprocal of 2 q, i.e., $$m = \frac{1}{2q} .$$

Assume that the retrieved reciprocal m has a precision of b bits. The retrieved reciprocal m therefore includes an error e introduced by the limited precision of the retrieved reciprocal m. Thus, the reciprocal ROM 130 outputs a reciprocal value m+e to the multiplier circuit 120. The multiplier circuit 120 multiplies the input signal |x| by the reciprocal (and error) m+e output from the reciprocal ROM 130 and outputs a value $$P = |x| \cdot (m+e) \quad (2)$$

This value P is inputted to a right bit shifter circuit 140. In addition, the right bit shifter circuit 140 receives the number of bits of precision b from the reciprocal ROM 130 and the sign of the input signal value sgn(x). The right bit shifter circuit 140 computes a value P' as follows:

$$\begin{aligned} P' &= \text{sgn}(x) \cdot P \cdot 2^{-b} \quad (3) \\ P' &= \text{sgn}(x) \cdot |x| \cdot (m+e) \cdot 2^{-b} \\ &= \text{sgn}(x) \cdot (|x| \cdot m \cdot 2^{-b} + |x| \cdot e \cdot 2^{-b}) \\ &= \text{sgn}(x) \cdot \left( \frac{|x|}{2q} + |x| \cdot e \cdot 2^{-b} \right) \end{aligned}$$

To that end, the right bit shifter shifts the value P b bits to the right and outputs the right shifted result P'. The right shifted result P' is truncated in a truncation circuit 150 to produce the quantized coefficient signal y, where $$y = \text{sgn}(x) \cdot \lfloor \frac{|x|}{2q} \rfloor \quad (4)$$

(The right bit shifter circuit 140 shifts the portion $|x| \cdot e \cdot 2^{-b}$ to the right of the decimal point and the truncation circuit 150 drops this portion.)

FIG. 5 shows a corresponding dequantizer 190 which may be used with the quantizer 100. The dequantizer 190 computes a reconstructed value r of the original input signal x using the quantized coefficient signal y. Assuming that r=x−e, we can form the following relation from equations (3) and (4):

$$r = \begin{cases} 0 & \text{if } y = 0 \\ q \cdot (2y + \text{sgn}(y)) & \text{if } y \neq 0 \text{ \& } q \text{ is odd} \\ q \cdot (2y + \text{sgn}(y)) - \text{sgn}(y) & \text{if } y \neq 0 \text{ \& } q \text{ is even} \end{cases} \quad (5)$$

The dequantizer 190 has a subtractor circuit 160 which receives the half step size q and outputs q−1. This difference q−1 and the half step size q are input to a multiplexer 165. The multiplexer receives the least significant bit (the $0^{th}$ bit) of the half step size q as a selection control input. If the least significant bit ("LSB") is a logic '0' (indicating that q is even), then the difference q−1 is selected. If the LSB is a logic '1' (indicating that q is odd) then q is selected. The selected output q or q−1 is input as a first input to a second multiplexer 175 and a negation circuit 170. The negation circuit outputs the negation of its input, i.e, either −q or −q+1. This negated value is fed as a second input to the second multiplexer 175. The multiplexer 175 receives the sign of the quantized coefficient signal sgn(y) (which may simply be the most significant bit of the quantized coefficient signal y) as a selector control input. The multiplexer 175 outputs the first, non-negated input, if y is positive, and the second negated input, if y is negative to an adder circuit 185.

The quantized coefficient signal y is fed to a multiplier circuit 180 which also receives the value 2 q. The multiplier circuit 180 outputs the product y·2 q to the adder circuit 185. The product y·2 q is then added together with the output from the second multiplexer 175 in an adder circuit 185.

Alternatively, a quantizer or dequantizer can be implemented using a pure table look-up technique. FIG. 6 shows such a quantizer 200. An input signal x is input to a conversion circuit 210 which outputs the magnitude |x| and sign sgn(x) of the input signal x. The magnitude |x| and half step size q are input to a ROM 220. These two input values are combined (appended) and used to index a third value which is the magnitude of the quantized coefficient signal |y|, which according to equation (4) may be predetermined by:

$$|y| = \lfloor \frac{|x|}{2q} \rfloor$$

The absolute value of the quantized coefficient signal |y| and the sign of the input signal sgn(x) are fed to a second conversion circuit 230 which outputs the quantized coefficient signal y in two's complement form.

FIG. 7 shows a corresponding table look-up technique dequantizer 250. The quantized coefficient signal y and half step size q are input to a ROM 270 and collectively index the magnitude of the reconstructed signal |r|. The magnitude of the reconstructed signal |r| and the sign of the quantized coefficient signal sgn(y) (i.e., the most significant bit of the quantized coefficient signal y) are input to a converter circuit 280 which outputs the two's complement form of the reconstructed signal r.

As can be seen, each prior art quantizer-dequantizer circuit requires a ROM circuit which utilizes a great deal of precious area on an integrated circuit chip. Secondly, each prior art dequantizer sub-circuit must receive the quantized coefficient signal y in order to produce the reconstructed value r. Thus, the processing of a reconstructed value r from an input signal x depends on the sum of the propagation delays of the quantizer circuit and the dequantizer circuit.

It is therefore an object of the present invention to overcome the disadvantages of the prior art.

SUMMARY OF THE INVENTION

These and other objects are achieved by the present invention which provides a division technique unified quantizer-dequantizer. In integer division, a dividend D is divided by a divisor d to produce an integral quotient Q and an integral remainder R, i.e.:

$$\frac{D}{d} = Q \text{ remainder } R, \text{ or } D = Q \cdot d + R \quad (6)$$

substituting D=|x|, Q=|y| and d=2q the following is obtained:

$$|x| = |y| \cdot 2q + R, \text{ or } |y| = \left\lfloor \frac{|x|}{2q} \right\rfloor \text{ and } R = |x| - \left\lfloor \frac{|x|}{2q} \right\rfloor \quad (7)$$

In a quantizer, the quantization noise e can be represented as a function of the remainder f(R) and is related to the reconstruction level r by:

$$e = f(R) = x - r \quad (8)$$

Equations (4), (7) and (5) may be combined to produce:

$$e = \begin{cases} \text{sgn}(y) \cdot R & \text{if } y = 0 \\ \text{sgn}(y) \cdot (R - q) & \text{if } y \neq 0 \text{ \& } q \text{ is odd} \\ \text{sgn}(y) \cdot (R - q - 1) & \text{if } y \neq 0 \text{ \& } q \text{ is even} \end{cases} \quad (9)$$

Furthermore, by combining equations (8) and (9), the reconstructed signal can be expressed as:

$$r = \text{sgn}(x) \cdot \left( |x| - \begin{cases} R & \text{if } y = 0 \\ (R - q) & \text{if } y \neq 0 \text{ \& } q \text{ is odd} \\ (R - q + 1) & \text{if } y \neq 0 \text{ \& } q \text{ is even} \end{cases} \right) \quad (10)$$

According to one embodiment, a unified division technique quantizer-dequantizer is provided with a division circuit. The division circuit receives the half step size q and an input signal x. The division circuit divides the input signal x by 2q according to equation (7) above and outputs a quantized coefficient signal y and a remainder R. The unified quantizer-dequantizer also has a circuit which illustratively receives the quantized coefficient signal y, the remainder R, the half step size q and the input signal x. This circuit calculates the reconstructed signal r according to equation (10) and outputs the reconstructed signal r. To that end the circuit illustratively includes an adder circuit for selectively adding together R, |x|, q and 1 to produce the reconstructed value r according to equation (10). A multiplexer circuit may illustratively be provided which is responsive to whether or not y=0. The multiplexer circuit is for receiving the half step size q and for outputting q and −1 to the adder circuit depending on whether q is odd or even and whether or not y>0.

Illustratively, a unified quantizer-dequantizer is provided which utilizes a division technique. The unified quantizer-dequantizer uses only a single integer division circuit and requires no ROM circuits. Thus, the unified quantizer-dequantizer is not only fast but conserves area required for layout on an integrated circuit chip.

BRIEF DESCRIPTION OF THE DRAWING

FIG. 2 shows a conventional zig-zag scan scheme.

FIG. 3 shows a conventional quantization function.

FIG. 7 shows a prior art look-up table technique dequantizer.

DETAILED DESCRIPTION OF THE INVENTION

Figure 8:
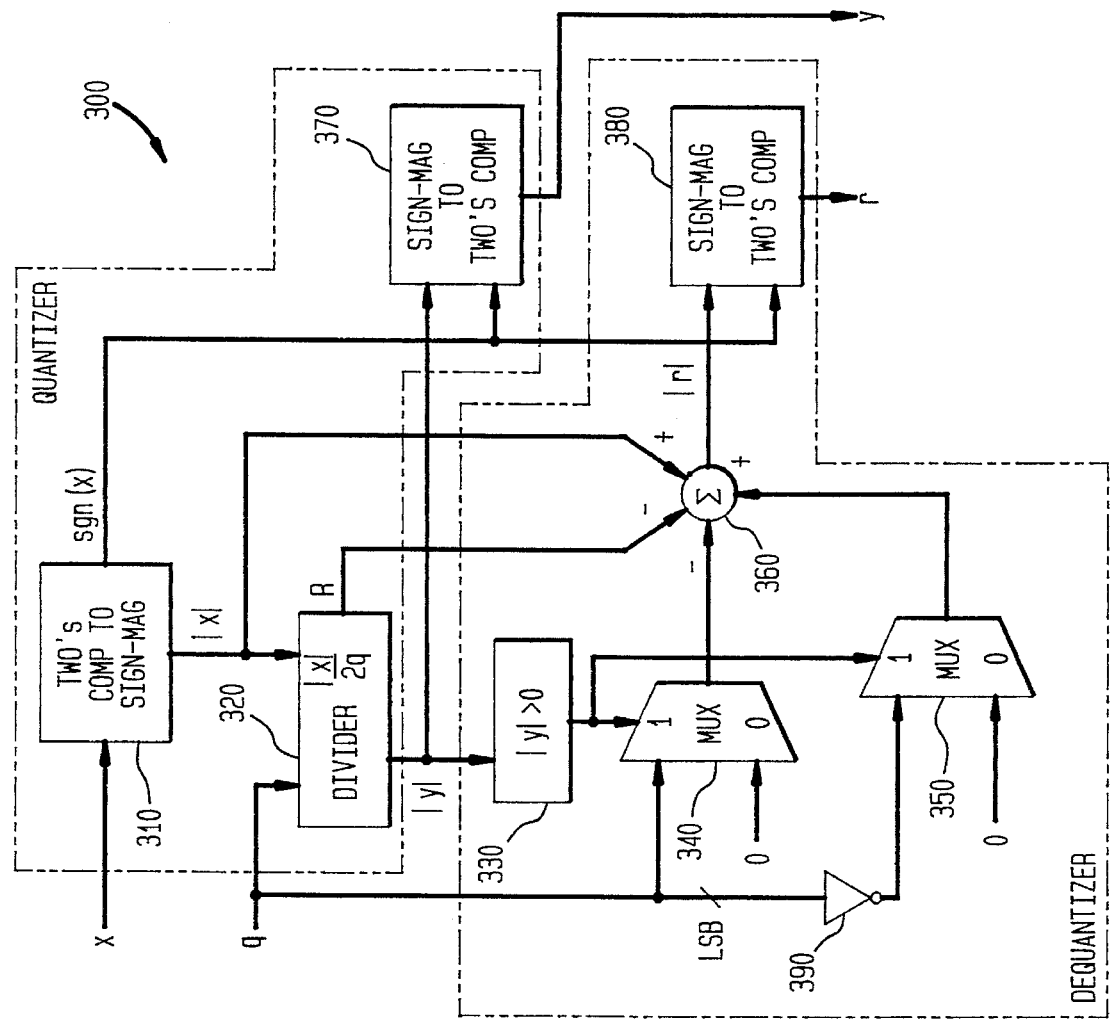
FIG. 8 shows a unified quantizer-dequantizer according to one embodiment of the present invention.

FIG. 8 shows a division technique unified quantizer-dequantizer circuit 300 according to the present invention.

The unified quantizer-dequantizer 300 has a conversion circuit 310 which receives an input signal x. The conversion circuit 310 converts the input signal x from two's complement form to sign-magnitude form. The conversion circuit 310 outputs the magnitude |x| and sign sgn(x) of the input signal x.

The unified quantizer-dequantizer 300 also has an integer division circuit 320. The integer division circuit 320 receives the unsigned magnitude of the input signal |x| and the quantization half step size q. The division circuit 320 divides unsigned the magnitude of the input signal |x| by 2q to produce unsigned the magnitude of the quantized coefficient signal |y| and remainder R according to the equation:

$$|x| = |y| \cdot 2q + R, \text{ or } |y| = \left\lfloor \frac{|x|}{2q} \right\rfloor \text{ and } R = |x| - \left\lfloor \frac{|x|}{2q} \right\rfloor \quad (7)$$

The absolute value of the quantized coefficient signal |y| is illustratively input to a decision circuit 330. The decision circuit 330 determines whether or not |y|>0. Illustratively, if |y|>0, the decision circuit 330 outputs a logic '1'; if |y|=0, the decision circuit 330 outputs a logic '0'. Note that the decision circuit 330 could also receive |x| and q and determine whether or not |x|≧2q, which determination is equivalent to |y|>0.

The logic signal output from the decision circuit 330 is received as a select control input of a first multiplexer 340 and a second multiplexer 350. The first multiplexer 340 receives the half step size q at a first input labeled '1' and the value 0 at a second input labeled '0'. If the first multiplexer 340 receives a logic '1' select control input (which occurs if |y|>0), the first multiplexer 340 outputs the value q. If the first multiplexer 340 receives a logic '0' select control input (which occurs if |y|=0), the first multiplexer 340 outputs 0.

The LSB of the step size q is input to an inverter circuit 390 which outputs the complement of the LSB of the half step size q. The second multiplexer 350 receives the complement of the LSB of the half step size q at a first input labeled '1'. If the half step size q is odd, then a logic '0' is input to the multiplexer 350 input labeled '1'. If the half step size q is even, then a logic '1' is input to the multiplexer 350 input labeled '1'. The multiplexer 350 receives 0 at a second input labeled '0'. If the second multiplexer 350 receives a logic '1' select control input (which occurs if |y|>0), the second multiplexer 350 outputs the complement of the LSB of q. If the second multiplexer 350 receives a logic '0' select control input (which occurs if |y|=0), the second multiplexer 350 outputs 0.

The unified quantizer dequantizer 300 has an adder circuit 360. The adder circuit receives unsigned the magnitude of the input signal |x| from the converter circuit 310, the negated remainder R output from the division circuit 320, the value outputted from the first multiplexer 340 and the negated value output from the second multiplexer 350. The latter three input values are addends of the quantization noise e according to the equation:

$$e = f(R) = \begin{cases} \text{sgn}(y) \cdot R & \text{if } y = 0 \\ \text{sgn}(y) \cdot (R - q) & \text{if } y \neq 0 \text{ \& } q \text{ is odd} \\ \text{sgn}(y) \cdot (R - q - 1) & \text{if } y \neq 0 \text{ \& } q \text{ is even} \end{cases} \quad (9)$$

The adder circuit therefore outputs unsigned the magnitude of the reconstructed ("dequantized") signal |r|=|x|−e which is determined from:

$$|r| = |x| - \begin{cases} R & \text{if } y = 0 \\ (R-q) & \text{if } y \neq 0 \text{ \& } q \text{ is odd} \\ (R-q+1) & \text{if } y \neq 0 \text{ \& } q \text{ is even} \end{cases} \quad (10)$$

The sign sgn(x) of the input signal is outputted from the converter circuit 310 to a second converter circuit 370. The magnitude of the quantized coefficient signal |y| is output from the division circuit 320 to the converter circuit 370. The converter circuit 370 combines unsigned the magnitude |y| and the sign sgn(x) and outputs the quantized coefficient signal y in two's complement form.

The sign sgn(x) of the input signal is also received at a third converter circuit 380. The adder circuit 360 outputs the unsigned magnitude of the reconstructed signal |r| to the converter circuit 380. The converter circuit 380 combines the unsigned magnitude |r| and the sign sgn(x) and outputs the signed reconstructed ("dequantized") signal r in two's complement form.

Figure 1:
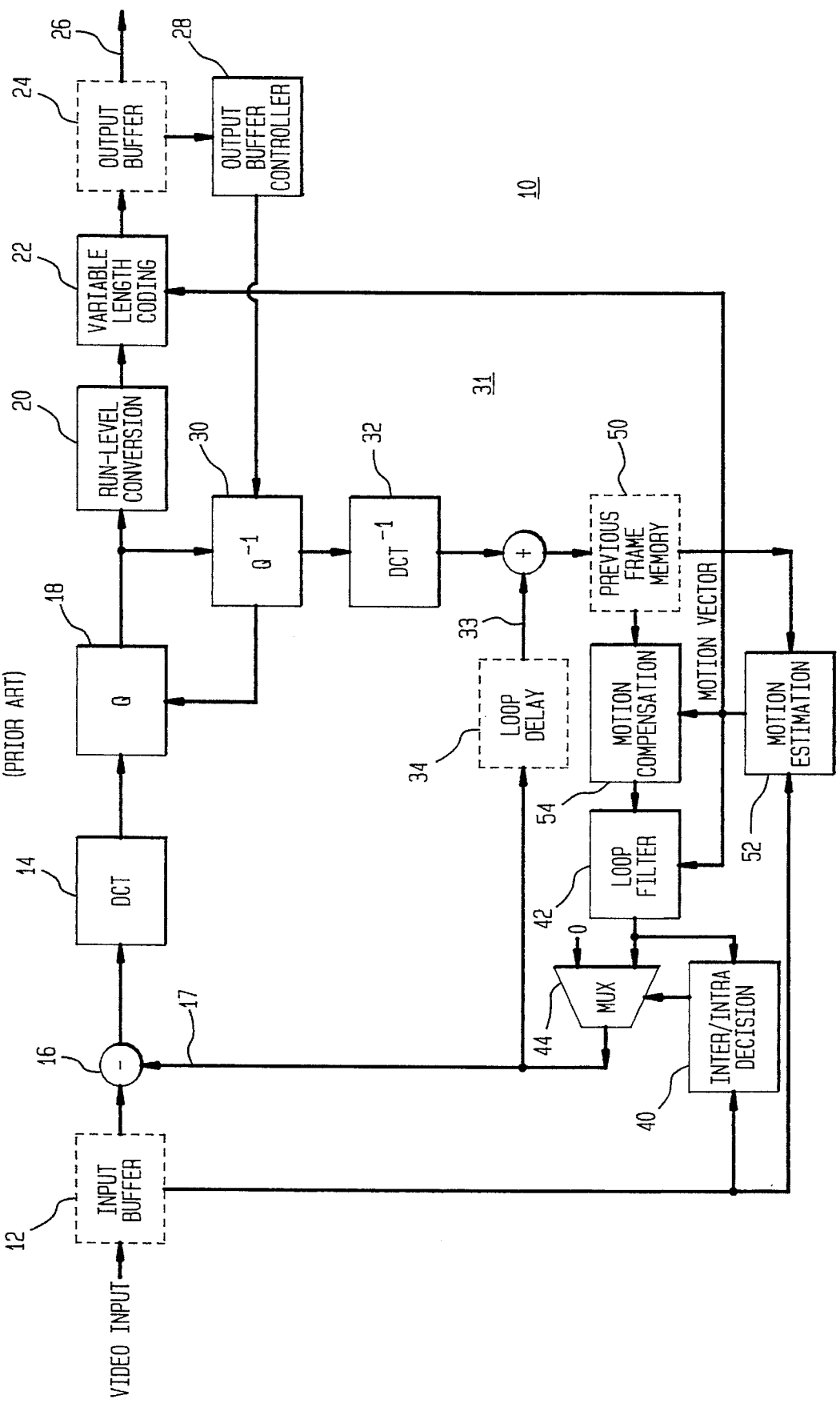
FIG. 1 shows a conventional H.261 encoder.
Figure 4:
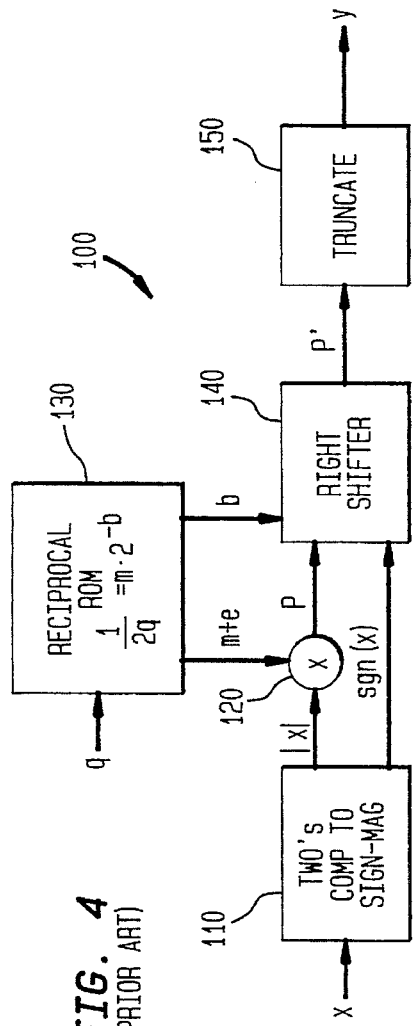
FIG. 4 shows a prior art multiplier technique quantizer.
Figure 6:
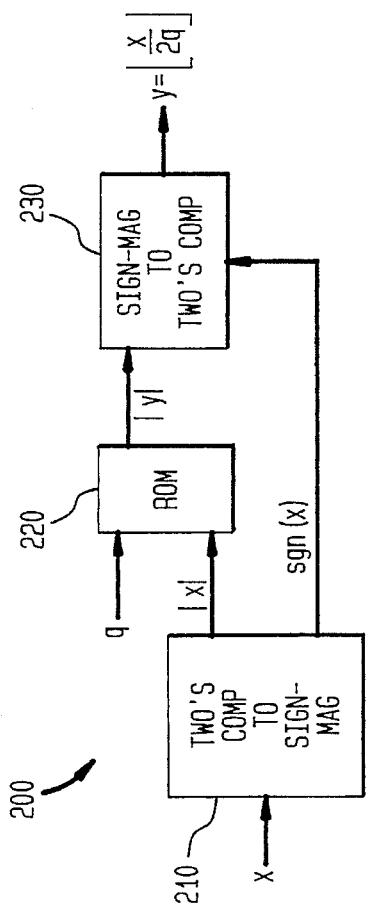
FIG. 6 shows a prior art look-up table technique quantizer.
Figure 5:
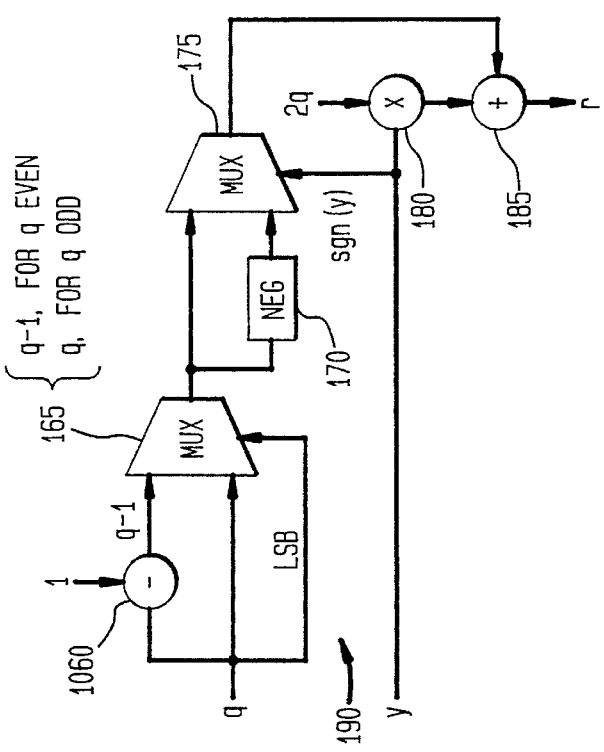
FIG. 5 shows a prior art multiplier technique dequantizer.

The operation of the invention is now briefly discussed. An input signal x comprising one or more digital values in two's complement form may be pre-scaled, if necessary. For certain applications, e.g., in an H.261 encoder 10 (FIG. 1) adapted according to MPEG or JPEG standards, the digital values of the input signal x may be input to the DCT coefficient matrix. The input signal x is then input to the converter circuit 310. Each value of the input signal x is converted to sign sgn(x) and magnitude |x| form.

The half step size q is input to the division circuit 320, multiplexer 340 and inverter circuit 390. The half step size q can be varied to affect the "dead zone" mentioned above (see FIG. 2). The unsigned magnitude |x| is also inputted to the division circuit 320 which outputs the unsigned magnitude of the quantized coefficient signal |y| and the remainder R.

The unsigned magnitude of the quantized coefficient signal |y| is input to the decision circuit 330. The decision circuit 330 outputs a logic '1' signal if |y|>0 and a logic '0' signal if |y|=0. The signal output from the decision circuit 330 is input as a selector control signal to the first and second multiplexers 340 and 350. The first multiplexer 340 selects the half step size q if |y|>0 and 0 if |y|=0. Likewise, the second multiplexer 350 selects the negated LSB of the half step size q if |y|>0 and 0 if |y|=0. If q is even, the negated LSB of q is a logic '1'; if q is odd, the negated LSB of q is a logic '0'.

The negated remainder R, the value selected by the first multiplexer 340, the negated value selected by the second multiplexer 350, and the unsigned magnitude of the input signal |x| are input to the adder circuit 360. Thus, the adder circuit 360 determines the quantization noise e and the unsigned magnitude of the reconstructed ("dequantized") signal |r|.

Equation 10 sets out how the unsigned magnitude of the reconstructed signal |r| is determined. The adder circuit 360 constructs |r| by receiving the following inputs: |x|, -R, and:

if |y|=0, then 0 from multiplexers 340, 350; if |y|≠0 and q is odd, then -q from multiplexer 340 and 0 from multiplexer 350; and if |y|≠0 and q is even, then -q from multiplexer 340 and +1 from multiplexer 350.

This is how the adder circuit 360 constructs |r|.

The unsigned magnitude of the quantized coefficient signal |y| and the sign of the input signal sgn(x) are input to the converter circuit 370. The unsigned magnitude of the reconstructed signal |r| and the sign of the input signal sgn(x) are inputted to the converter circuit 380. The converter circuit 370 outputs the quantized coefficient signal y in two's complement form and the converter circuit 380 outputs the signed reconstructed signal r in two's complement form.

In the circuit 300, no ROMs are employed. Such ROMs would occupy a great deal of surface area on an integrated circuit chip. Furthermore, only a single integer division circuit 320 is used which utilizes a comparable amount of space and computation time as a multiplier circuit. Furthermore, although in the circuit 300 the unsigned magnitude of the quantized coefficient signal |y| is used in computing the reconstructed dequantized value r, this is only for purposes of convenience. As stated above, the decision circuit 330 can be modified to simply determine whether |x|≥2q which is an equivalent determination to |y|>0. Thus, the circuit 300 can be modified to calculate the reconstructed value r independently of |y| (or in parallel with the calculation of |y| in the division circuit 320) and therefore at an increased speed.

In summary, a division technique unified quantizer-dequantizer is disclosed which conserves area on an integrated circuit chip and which operates at a high processing speed. The unified quantizer-dequantizer utilizes a single division circuit for dividing an input signal x by two times the half step size q to produce the quantization coefficient signal y and a remainder R. The remainder R is then used to compute the quantization noise e and the reconstructed signal r. The unified quantizer-dequantizer does not require any ROM circuits. Nor must the reconstructed signal r be computed after the quantized coefficient signal y is computed. Thus, the dequantization processing speed may be increased dramatically.

Finally, the invention has been described above with reference to illustrative embodiments. Those having ordinary skill in the art may devise numerous other embodiments without departing from the spirit and scope of the following claims.

I claim:

1. A process for quantizing and dequantizing an input digital signal x to produce a quantized coefficient signal y and a reconstructed (dequantized) signal r, comprising the steps of:

inputting into a quantizer circuit an input signal x and a half quantization step size q, outputting from said quantizer circuit a quantized coefficient signal y and a remainder R, where:

$$|y| = \left\lfloor \frac{|x|}{2q} \right\rfloor \text{ and } R = |x| - \left\lfloor \frac{|x|}{2q} \right\rfloor$$

and inputting into to an adder and conversion circuit a magnitude |x| of the input digital signal, a remainder R, q when y≠0, and 1 when y≠0 and q is even;

outputting from an adder and conversion circuit, a reconstructed signal r where:

$$r = \text{sgn}(x) \cdot \left( |x| - \begin{cases} R & \text{if } y = 0 \\ (R-q) & \text{if } y \neq 0 \ q \text{ is odd} \\ (R-q+1) & \text{if } y \neq 0 \ q \text{ is even} \end{cases} \right)$$

2. A unified quantizer-dequantizer circuit, comprising:

a division circuit receiving a half step size q and an input signal x and outputting a quantized coefficient signal y and a remainder R, where $$|y| = \lfloor \frac{|x|}{2q} \rfloor \text{ and } R = |x| - \lfloor \frac{|x|}{2q} \rfloor$$

a first circuit receiving a magnitude of the quantized coefficient signal |y|, said remainder R, said half step size q, and said input signal x and outputting a reconstructed signal r where, $$r = \text{sgn}(x) \cdot \left( |x| - \begin{cases} R & \text{if } y = 0 \\ (R-q) & \text{if } y \neq 0 \ q \text{ is odd} \\ (R-q+1) & \text{if } y \neq 0 \ q \text{ is even} \end{cases} \right)$$

3. The circuit of claim 2 wherein said first circuit further comprises a comparator circuit for outputting a select control signal which depends on whether or not |y|=0.

4. The circuit of claim 3, wherein said first circuit further comprises a multiplexer circuit receiving said signal output from said comparator circuit, and said half step size q, for outputting the value 0, if |y|=0, for outputting the value q, if |y|>0 and if q is odd, and for outputting the values q and 1 if |y|>0 and if q is even.

5. The circuit of claim 4, wherein said first circuit further comprises an adder and conversion circuit for selectively adding together a magnitude |x| of said input signal x, said remainder R, said values selected by said multiplexer circuit, and a sign sgn(x) of said input signal x to compute said reconstructed signal r.

6. The circuit of claim 2, wherein said division circuit further comprises a conversion circuit receiving a two's complement input signal x and outputting a magnitude of said input signal |x| and a sign of said input signal sgn(x).

7. The circuit of claim 6, wherein said division circuit further comprises a second conversion circuit receiving said sign of said two's complement input signal sgn(x) and a magnitude of said quantized coefficient signal |y| and outputting said quantized coefficient signal y in two's complement form.

8. The circuit of claim 6, wherein said first circuit further comprises a third conversion circuit receiving a magnitude of said reconstructed signal |r| and said sign of said input signal sgn(x) and outputting said reconstructed signal r in two's complement form.

9. The circuit of claim 2 wherein said half step size q input to said division circuit for values of said input signal x varies to affect a dead zone.

10. An H.261 encoder comprising a division technique unified quantizer-dequantizer, said division technique unified quantizer dequantizer comprising:

a division circuit receiving a half step size q and an input signal x and outputting a quantized coefficient signal y and a remainder R, where $$|y| = \lfloor \frac{|x|}{2q} \rfloor \text{ and } R = |x| - \lfloor \frac{|x|}{2q} \rfloor$$

a first circuit receiving a magnitude |y| of a quantized coefficient signal y, said remainder R, said half step size q, a magnitude |y| of the input signal x, and a sign sgn(x) of said input signal x, and outputting a reconstructed dequantized signal r where, $$r = \text{sgn}(x) \cdot \left( |x| - \begin{cases} R & \text{if } y = 0 \\ (R-q) & \text{if } y \neq 0 \ q \text{ is odd} \\ (R-q+1) & \text{if } y \neq 0 \ q \text{ is even} \end{cases} \right)$$

* * * * *